United States Patent Office 2,707,482
Patented May 3, 1955

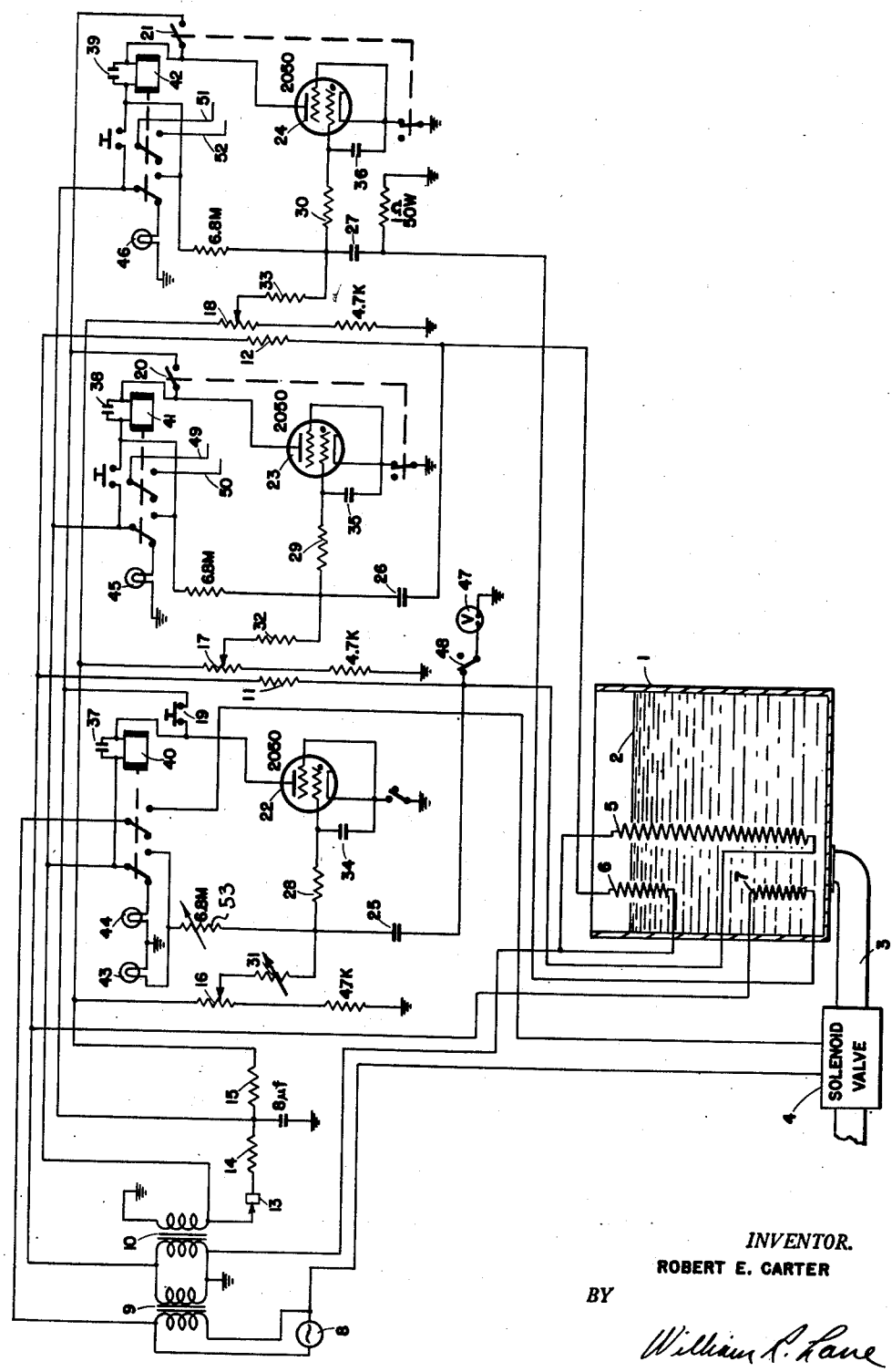

2,707,482

ELECTRONIC LIQUID LEVEL CONTROLLER

Robert E. Carter, Alameda, Calif.

Application July 3, 1951, Serial No. 234,987

4 Claims. (Cl. 137—392)

This invention relates to means for controlling the level of liquid in a container, and particularly to an electronic apparatus for such control and for warning of impending overflow or exhaustion of the liquid in the container should the controlling means fail.

The resistance of a conductor varies directly with temperature. The temperature of a conductor carrying an electric current varies, in turn, with the rate of heat transfer from the conductor. A conductor immersed in a fluid suffers greater heat transfer than a conductor in air, or any other gas, because the heat transfer across a gas-solid interface is less than the heat transfer across a liquid-solid interface. This invention contemplates an automatic liquid level control and overflow-exhaustion warning apparatus which is dependent for its operation upon the principle that as the amount of immersion of a current carrying conductor varies, so also varies the resistance thereof.

It is therefore an object of this invention to provide an automatic liquid level controller.

It is another object of this invention to provide an automatic liquid level controller adapted to measure the level of liquid in a container.

It is another object of this invention to provide apparatus for warning of impending overflow or exhaustion of a liquid in a container.

Other objects of invention will become apparent from the following description taken in connection with the accompanying single figure which is a schematic drawing of the invention.

Referring to the single figure, a container 1 containing a fluid 2 is supplied by conductor 3 through solenoid valve 4. Immersed in the container, as shown in the figure, are resistive electrically conductive elements 5, 6, and 7. Element 5 extends substantially throughout the depth of the container, while elements 6 and 7 are disposed vertically near the top and bottom of the container. Current to operate the apparatus is supplied from alternating current source 8 connected to transformer 9, which in turn is connected to transformer 10. The secondary of transformer 9 is connected directly to one end of element 7 and to one end of elements 5 and 6 through resistance 11 and 12, respectively. The other ends of elements 5, 6, and 7 are grounded. The secondary of transformer 10 is connected to ground and to rectifier 13 which supplies direct current through resistances 14 and 15 to resistances 16, 17, and 18, and to switches 19, 20, and 21. Elements 5, 6, and 7 are also connected to the grids of thyratrons 22, 23, and 24, respectively, through capacitors 25, 26, and 27 and resistances 28, 29, and 30, respectively. Bias for the grids of these thyratrons is furnished through resistances 31, 32, and 33 from variable resistances 16, 17, and 18, respectively. The cathodes of thyratrons 22, 23, and 24 are normally grounded and connected to the grids thereof by capacitances 34, 35, and 36. The plates of thyratrons 22, 23, and 24 are supplied with alternating current in the secondary of transformer 10 through capacitances 37, 38, and 39, while the direct current output thereof is fed through relays 40, 41, and 42. Relay 40 is connected to supply current from alternating current source 8 to solenoid valve 4 when actuated by passage of current through thyratron 22. Relays 40, 41, and 42 also control flow of current to signal lights 43, 44, 45, and 46. Voltmeter 47 may be connected by means of switch 48 to read the voltage drop across element 5. Relays 41 and 42 also close circuits connected by leads 49, 50, 51 and 52 to connect or disconnect related equipment in the emergency created or threated by overflow or exhaustion of liquid 2.

Assuming that liquid 2 is being consumed or evaporated at a relatively slow rate, as the level of liquid 2 decreases in container 1 the heat transfer from element 5 decreases as more and more of it is exposed to the atmosphere. As heat transfer from element 5 decreases its temperature increases, and so does its resistance. As its resistance increases, the potential drop across it rises, as may be indicated by voltmeter 47, which may be calibrated in terms of depth of fluid in container 1. The rise in potential drop across element 5 is also communicated to the grid of thyratron 22, whose bias is set by means of resistance 16 so that it fires when the level of liquid 2 reaches a predetermined upper limit and ceases to fire when a predetermined lower limit is reached. Relay 40 is shown in the figure in closed condition. Cutoff of current through thyratron 22 opens relay 40, which turns off green signal light 44 and turns on amber signal light 43, indicating that the container is in process of being filled. Relay 40 then also cuts off power to solenoid valve 4, which opens, allowing fluid to flow into container 1. As the container fills, heat transfer from element 5 to the surrounding liquid increases with the corresponding decrease in temperature of the element. As the element grows colder, the voltage drop across it decreases progressively until thyratron 22 again fires. The upper limit of liquid level in container 1 has then been reached. When thyratron 22 fires, relay 40 closes, again supplying current to solenoid valve 4 and causing flow of liquid into container 1 to stop. Thyratron 22 is extinguished when due to increasing the resistance of resistive element 5 the potential of the grid rises above a predetermined value and because the plate of the thyratron is at all times receiving alternating current through capacitor 37. It will be noted that applied to the grid there is a pulsating direct current, while applied to the plate there is an alternating current. Consequently, whenever the grid becomes sufficiently positive, during the next half-cycle, when the plate goes negative, the thyratron is extinguished. This is in accordance with the well-known theory of operation of thyratrons.

Should the solenoid valve fail to close, or should thyratron 22, or any of the related circuit components fail to function as intended, element 6 comes into play. Since element 6 is located near the top of the container, the bias on the grid of thyratron 23 may be adjusted so that it does not fire until the liquid level exceeds the permissible height by a finite amount. Should the container tend to overflow, thyratron 23 fires, closing relay 11 which energizes red signal light 45 and closes a circuit including leads 49 and 50 which may be used to turn on or off external equipment affected by the overflow condition.

Likewise, should the level of liquid in container 1 fall below the permissible minimum value, element 7 connected to the grid of thyratron 24, which conducts so long as element 7 is adequately covered by fluid, becomes the controlling sensing element. When thyratron 24 cuts off, relay 42 is closed, closing an external circuit connected to leads 51 and 52 and turning red signal light 46 on to indicate that the level of liquid in the container has fallen below the permissible value.

Voltmeter 47 may be left continuously connected to indicate at all times the level of liquid in container 1, or may be connected periodically to give a spot check of liquid level.

The differential range, i. e., the difference in height between the level where solenoid valve 4 is opened and the level where solenoid valve 4 is closed, is controlled by variable resistance 53 which feeds back to the grid of thyratron 22 an A.-C. voltage of sufficient magnitude and opposite in phase to the signal applied to the grid through element 5 when the tube is not conducting. In this manner the thyratron is kept from conducting until the resistance of element 5 drops far enough so that sufficient voltage is supplied to the grid of the tube through element 5 to fire it in spite of the bias furnished through resistor 53. This is applied as soon as relay 40 is actuated and is obtained from the secondary of transformer 10 as shown. Similar resistances are provided for the circuits in which thyratrons 23 and 24 are included to keep the warning signal lamps energized until the operator is ready to reset, which operation is accomplished by means of switches 20 and 21. When these switches are in the position shown in the figure, warning light 45 is turned on when overflow is threatened, while warning light 46 is turned on when fluid exhaustion is threatened. When the cause of malfunctioning has been corrected, the operator actuates switches 20 and 21 momentarily, which in turn causes the actuation of relays 41 and 42 to turn lights 45 and 46 off, and opens the cathode to ground connection of the thyratron to stop conduction therethrough. Switch 19 may be closed to actuate relay 40 in case thyratron 22 fails to fire.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for automatically indicating and maintaining the level of liquid in a container comprising a resistance element disposed vertically in said container and extending both above and below the surface of said liquid, means for applying an electrical potential to said element, a voltmeter adapted to indicate the voltage drop across said element, conduit means including a solenoid valve for supplying fluid to said container, a relay for supplying current to actuate said solenoid valve, and thyratron means sensitive to the voltage drop across said element for supplying current to said relay whereby when, due to lowering of the level of said liquid, the difference between the heat transfer between the gas-solid interface of said element above the surface of said liquid and the liquid-solid interface of said element below the surface of said liquid becomes great enough to materially affect the voltage drop across said element, said thyratron ceases to conduct, closing said relay and opening said solenoid valve to refill said container, and when said liquid level has been reestablished at a predetermined point said thyratron commences to conduct, opening said relay and closing said solenoid valve, and said voltmeter continuously indicates the level of said liquid in said container.

2. Means for automatically maintaining the level of a liquid in a container and for warning of impending overflow and exhaustion of said liquid comprising a first resistive electrically conducting element disposed vertically in said container and extending above the surface of said container, a second resistive electrically conducting element disposed vertically near the bottom of said container, a third resistive electrically conducting element disposed vertically at the top of said container, means for supplying a voltage to said elements, electronic means including a thyratron, a relay, and a solenoid actuated valve for controlling flow of liquid to said container in response to variations in voltage drop across said first element, electronic means including a thyratron and signal means for warning of impending exhaustion of said liquid in response to variations in voltage drop across said second element, and electronic means including a thyratron and signal means for warning of impending overflow of said liquid in response to variations in voltage drop across said third element whereby said first element and the apparatus responsive thereto normally maintains the level of said liquid between predetermined limits, but should said apparatus fail, said second or third elements warn of overflow or exhaustion.

3. A device as recited in claim 2 and futrher comprising means responsive to current flow through said electronic means for preventing current flow through said thyratron until a predetermined level has been attained in said container.

4. A device as recited in claim 2 in which said first electronic means comprises a thyratron having its grid element connected to be responsive to voltage drop across said first resistance element and a variable resistance for supplying blocking voltage to said grid to thereby maintain said thyratron in nonconducting condition until a predetermined level, determined by said variable resistance, has been attained in said container.

References Cited in the file of this patent

UNITED STATES PATENTS

| 1,942,241 | Duhme | Jan. 2, 1934 |
| 2,211,606 | Pratt | Aug. 13, 1940 |

FOREIGN PATENTS

| 622,247 | France | Feb. 21, 1927 |
| 773,296 | France | Aug. 27, 1934 |